United States Patent [19]

Huybrechts et al.

[11] Patent Number: 4,891,401
[45] Date of Patent: Jan. 2, 1990

[54] PIGMENT DISPERSANT RESIN WITH P-CONTAINING ACID

[75] Inventors: Jozef T. Huybrechts, Oud-Turnhout; Guido R. Louis van den Bosch, Hever-Schiplaken; Rudolf F. Landriette Verhaegen, Duffel, all of Belgium

[73] Assignee: E. I. Du Pont De Nemours and Company, Wilmington, Del.

[21] Appl. No.: 326,936

[22] Filed: Mar. 22, 1989

Related U.S. Application Data

[60] Continuation of Ser. No. 209,465, Jun. 21, 1988, abandoned, which is a division of Ser. No. 934,254, Nov. 24, 1986, abandoned, which is a continuation-in-part of Ser. No. 913,402, Sep. 30, 1986, abandoned.

[51] Int. Cl.$^4$ ............... C08F 230/02; C08K 3/00
[52] U.S. Cl. ............... 524/807; 524/247; 524/251; 526/277; 526/278
[58] Field of Search ............... 524/807

[56] References Cited

U.S. PATENT DOCUMENTS

| | | | |
|---|---|---|---|
| 2,914,499 | 11/1959 | Sheetz | 526/287 |
| 3,711,449 | 1/1973 | Brendley | 526/287 |
| 3,898,037 | 8/1975 | Lange | 252/149 |
| 4,001,150 | 1/1977 | June | 526/287 |
| 4,008,293 | 2/1977 | Maska | 526/287 |
| 4,177,178 | 12/1979 | Das . | |
| 4,450,013 | 5/1984 | Hirsch | 106/308 |
| 4,612,343 | 9/1986 | Okuzono et al. | 524/547 |
| 4,704,165 | 11/1987 | Nakamura | 106/308 |

FOREIGN PATENT DOCUMENTS

| | | |
|---|---|---|
| 58865 | 9/1982 | European Pat. Off. . |
| 129329 | 12/1984 | European Pat. Off. . |
| 170474 | 7/1986 | European Pat. Off. . |

Primary Examiner—Christopher Henderson
Attorney, Agent, or Firm—Richard H. Burgess

[57] ABSTRACT

Acrylic polymers with carboxylic acid and small amounts of phosphorus-containing strong acids are good pigment dispersants for use in water-based coating compositions.

2 Claims, No Drawings

PIGMENT DISPERSANT RESIN WITH P-CONTAINING ACID

CROSS REFERENCE TO RELATED APPLICATIONS

This is a continuation of application Ser. No. 209,465, now abandoned, filed 6/21/88, which is a division of Ser. No. 934,254, now abandoned, filed 11/24/86, which is a continuation-in-part of Ser. No. 913,402, filed 9/30/86, now abandoned.

BACKGROUND

The present invention comprises a pigment dispersant. More particularly, it comprises such a dispersant having an acrylic resin containing organic acid and strong-acid phosphorus-containing monomers.

Sulfur- and phosphorus-containing monomers, including 2-acrylamide-2-methylpropane sulfonic acid (AMPS), have been polymerized with acrylics and other monomers in various proportions for a variety of purposes, including for use in dispersing sediments in water. However, an optimum dispersant resin for use in water-based coating compositions has remained an elusive desideratum.

U.S. Pat. No. 4,450,013—Hirsch et al. (1984) teaches a pigment grinding or dispersing resin of, for instance, 40-90% by weight acrylic acid, 10-60% AMPS, and 0-10% acrylonitrile, or equivalent monomers. (Parts, percentages and proportions herein are by weight except where indicated otherwise).

U.S. Pat. No. 3,711,449—Brendley (1973) teaches interpolymers of 0.2-1.0% AMPS with other acrylates or methacrylates.

U.S. Pat. No. 3,898,037—Lange et al. (1975) teaches acrylamido-sulfonic acid polymers such as AMPS which may be copolymerized with other acrylics, and their use in corrosion inhibition.

U.S. Pat. No. 4,177,178—Das et al. (1979) teaches the use of AMPS copolymerized with other acrylics including long chain acrylics such as stearyl methacrylate, with a molecular weight of 15,000 to 100,000. These are said to be used to make thermosetting automotive topcoat paints.

U.S. Pat. No. 4,001,150—June et al. (1977) teaches the use of phosphoric or sulfonic esters, including AMPS, copolymerized with acrylics such as methacrylic acid, for use as an electroconductive resin.

U.S. Pat. No. 2,914,499—Sheetz (1959) teaches the use of various acrylic esters of sulfonic acid in emulsion polymerization.

U.S. Pat. No. 4,008,293—Maska et al. (1977) teaches the preparation of crosslinkable coating compositions containing, for instance, AMPS, as an internal crosslinking catalyst.

European Patent Publication 129,329—Farrar et al. (1984) teaches pigment dispersions using copolymers of acrylic acid with 1-50% AMPS having molecular weights in the range of 1,000 to 5,000, or up to 5700, with a low polydispersity.

European Patent Publication 58,865—Perrey et al. (1982) teaches pigment dispersants with 1-10% pigment, using various acrylic sulfonic acid polymers.

European Patent Publication 170,474—Backhouse (1986) teaches the use of phosphorus-containing compounds in water-based polymers to reducing gasing from metal pigments.

SUMMARY OF THE INVENTION

The present invention provides a pigment dispersant resin comprising copolymerized units of the following monomers in weight percent based on the polymer solids:

(a) 1.5-4% of at least one unsaturated strong-acid functional acrylic monomer having the structure

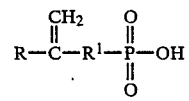

wherein R is H or $CH_3$
$R^1$ is an ester, amido, alkyl, or ether linkage having 1-4 carbon atoms, (b) 1-10% of at least one organic-acid-functional acrylic monomer selected from acrylic acid, methacrylic acid, and maleic fumaric and itaconic acids and esters, (c) 86-96% of at least one ethylenically unsaturated monomer selected from the group consisting of acrylate and methacrylate esters of alcohols having 1-12 carbon atoms, styrene, acrylonitrile, methacrylonitrile, acrylamide, methacrylamide vinyl acetate, vinyl chloride, dialkyl esters with 1-12 carbon atoms of maleic, fumaric and itaconic acids, and hydroxy-functional acrylates and meth-acrylates from alcohols or esters having 1-4 carbon atoms, said resin having a weight average molecular weight in the range of about 5,500-30,000 and an acid number in the range of about 30-120.

Preferably, the phosphorus-containing monomer is methacryloxyethylphosphate (MOP).

The invention also includes water-based dispersions of the esin of the invention (including more or less of the resin in solution), with 50-150% of the amount of tertiary amine needed for neutralization. Pigment dispersions are also needed.

DETAILED DESCRIPTION

Evidently 1% MOP is too little in polymers of the invention to obtain desirable dispersant effects, and 5% is too much in that it causes major viscosity increases and instability in paints. Molecular weight of the polymer is important. Measured as the weight average, 4,000 is too small to obtain the advantages of the invention, 5,500 or 6,000-15,000 seems preferred, although 15,000-30,000 or 40,000 is acceptable.

The preferred phosphorus-containing monomer for the invention is

MOP (Methacryloxyethylphosphate)

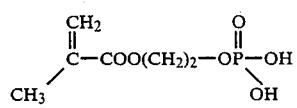

Water based coating composition technology is based on a higher molecular weight or crosslinked latex giving rheology control with a water dispersible or soluble crosslinker such as a methylated melamine resin. The amount of inorganic acid in the dispersing resin is important for the stability of and the compatibility with the latex. With larger amounts than in this invention, one could expect real problems in film properties and compatibility, at least with certain resins. It is also known that reactive melamine resins are sensitive to self condensation and hydrolysis in presence of strong acids giving unstable products in the can. Too high acid values in general do give cured films which are sensitive to humidity. The rest of the copolymer composition can be based on any unsaturated monomer such as acrylate, methacrylate, styrene, vinyl maleate, acrylamides or methacrylamides, or acrylonitrile or methacrylonitrile. Certain preferred compositions contain MMA (methylmethacrylate) and BA (butylacrylate). The copolymers should also have preferably hydroxy functionality to become an integral part of the cured polymer network. HEMA (hydroxyethyl methacrylate) is preferred but one could also use HEA (Hydroxyethylacrylate) or less reactive HPA (hydroxy-propylacrylate) or HPMA (hydroxypropylmethacrylate). HEMA is preferred over HEA because of its better hydrolysis resistance and over HPA, HPMA, HBA (hydroxybutyl acrylate) because it renders the copolymer more water soluble. Too low a molecular weight will not give a polymeric dispersant, resulting in poor film properties, and too high molecular weight can give compatibility problems with the other film constituents and too high viscosities with the dispersions.

The copolymers are made by radical polymerization using solvents as diluents which are preferably water soluble. Isopropanol (IP) is in this technology a good candidate since it forms a low boiling azeotrope with water. Chain transfer agents (e.g. mercaptans) can be used to control the molecular weight.

| Example 1 - Resin Preparation | | |
|---|---|---|
| IP | 1534 | |
| Heat up to reflux at 80° C. in a 4 Li flask | | |
| MMA | 751.6 | |
| BA | 1004.7 | |
| HEMA | 102.3 | |
| AA | 102.3 | |
| MOP | 41.3 | |
| IP | 302.6 | |
| Triganox 25C75 | 20.5 | t-butylperoxy-pivalate from AKZO |
| Add monomer + initiator blend over 3 hour period | | |
| Triganox 25C75 | 10 | |
| IP | 40 | |
| Add and hold for 2 hours for complete conversion | | |
| Test results: | | |
| Solids | 51 | |
| Visc. | | U (Gardner Holdt) |
| Acid Value | 50.4 | |

EXAMPLE 2

In variations on example 1, the following resin solutions were prepared.

| | MMA | BA | HEMA | AA | MOP |
|---|---|---|---|---|---|
| Example 1 | 37.5 | 50.4 | 5.1 | 5.1 | 2.1 |
| Example 2 | 40 | 37 | 16 | 5 | 2 |
| Test results: | Solids-% | MN | MW | D | AN | VISC |
| 1 | 51 | 3600 | 9500 | 2.7 | 50.4 | U |
| 2 | 57.3 | 3200 | 7560 | 2.4 | 48.3 | Y |

All resin solutions were neutralized with AMP (aminomethylpropanol) to pH 8.4–8.7 and diluted to 50% solids with deionized water (where relevant).

EXAMPLE 4

Pigment Dispersion (A) Sicotrans L 2817 transparent iron oxide red from BASF

Following blends made with a Cowless mixer blade and afterwards ground in suitable equipment such as Dynomill, ball mill, etc.

Constraints:
10% < Sicotrans L 2817 < 30%
15% < Neutralized resin solution < 80% 50% solids
10% < Deionized water/Propyleneglycol < 75% blend All dispersions were tested for gloss, transparency, rheology. Example 2 gave the best results.

EXAMPLE 5

Pigment Dispersion (B) Ti-pure 902 titanium dioxide from Du Pont

The same tests were run as above with following constraints:
$40 < TiO_2 < 85\%$
10 < Neutralized resin solution < 55%
5 < Deionized water < 50%

Resin examples 1 and 2 gave excellent results.

We claim:

1. An aqueous dispersion of a resin containing tertiary amine in an amount from 50% to 150% of the amount needed for stoichiometric neutralization of said resin, said resin comprising copolymerized units of the following monomers in weight percent based on the polymer solids:
   (a) 1.5–4% of methacryloxy phosphate,
   (b) 1–10% of at least one organic-acid-functional acrylic monomer selected from acrylic acid, methacrylic acid,
   (c) 86–96% of at least one monomer selected from methyl methacrylate and butyl acrylate, and hydroxyethyl methacrylate, said resin having a weight average molecular weight in the range of about 5,500–30,000 and an acid number in the range of about 30–120 prior to neutralization.

2. The dispersion of claim 1 having a weight average molecular weight in the range of 6,000–15,000.

* * * * *